United States Patent
Wiesbeck et al.

(10) Patent No.: US 11,155,256 B2
(45) Date of Patent: Oct. 26, 2021

(54) CONTROL SYSTEM COMPRISING AT LEAST ONE ELECTRONIC CONTROL UNIT FOR CONTROLLING AN INTERNAL COMBUSTION ENGINE IN A HYBRID VEHICLE

(71) Applicant: Bayerische Motoren Werke Aktiengesellschaft, Munich (DE)

(72) Inventors: Ferdinand Wiesbeck, Munich (DE); Michael Etzel, Munich (DE); Andreas Rank, Olching (DE); Jochen Schroeder, Munich (DE); Christian Glatz, Unterfoehring (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/038,560

(22) Filed: Jul. 18, 2018

(65) Prior Publication Data

US 2018/0319391 A1     Nov. 8, 2018

Related U.S. Application Data

(63) Continuation of application No. PCT/EP2017/050874, filed on Jan. 17, 2017.

(30) Foreign Application Priority Data

Jan. 19, 2016 (DE) .................... 10 2016 200 605.3

(51) Int. Cl.
*B60T 7/12* (2006.01)
*B60W 20/20* (2016.01)
(Continued)

(52) U.S. Cl.
CPC ............. *B60W 20/20* (2013.01); *B60K 6/387* (2013.01); *B60K 6/448* (2013.01);
(Continued)

(58) Field of Classification Search
CPC ... B60K 6/00; B60L 3/00; B60L 58/10; B60L 58/12; B60L 58/31; B60L 2240/10; B60L 2260/00; B60W 20/00; B60W 2510/24
(Continued)

(56) References Cited

U.S. PATENT DOCUMENTS

| 5,842,534 | A | * | 12/1998 | Frank | ....................... | B60K 6/48 |
| | | | | | | 180/65.25 |
| 6,116,363 | A | * | 9/2000 | Frank | ....................... | B60K 6/48 |
| | | | | | | 180/65.25 |

(Continued)

FOREIGN PATENT DOCUMENTS

| CN | 101028819 A | 9/2007 |
| CN | 104071150 A | 10/2014 |

(Continued)

OTHER PUBLICATIONS

International Search Report (PCT/ISA/210) issued in PCT Application No. PCT/EP2017/050874 dated Apr. 20, 2017 with English translation (six (6) pages).

(Continued)

*Primary Examiner* — John Kwon
(74) *Attorney, Agent, or Firm* — Crowell & Moring LLP

(57) ABSTRACT

A control system has at least one electronic control unit for controlling an internal combustion engine in a hybrid vehicle, which records at least the vehicle speed and the driver's desired driving performance and the driving performance specified by a safety control system or a driver assistance system. The control unit is designed such that, below a pre-defined vehicle speed threshold and/or in the event of recognition of an urban area, while in a purely electric driving mode, it only engages the internal combustion engine when the current desired driving performance exceeds a pre-defined upper threshold, preferably once the (Continued)

maximum tractive force at the wheel for purely electric driving is at least reached.

6 Claims, 4 Drawing Sheets

(51) Int. Cl.
  *B60W 50/00* (2006.01)
  *B60K 6/448* (2007.10)
  *B60K 6/387* (2007.10)
  *B60K 6/52* (2007.10)
  *B60W 20/00* (2016.01)

(52) U.S. Cl.
  CPC .......... *B60W 50/0097* (2013.01); *B60K 6/52* (2013.01); *B60W 20/00* (2013.01); *B60W 2520/10* (2013.01); *B60W 2540/10* (2013.01); *B60W 2540/103* (2013.01); *B60W 2540/106* (2013.01); *B60W 2552/05* (2020.02); *Y02T 10/40* (2013.01); *Y02T 10/62* (2013.01)

(58) Field of Classification Search
  USPC .......................................... 701/22, 101, 102
  See application file for complete search history.

(56) References Cited

U.S. PATENT DOCUMENTS

| | | |
|---|---|---|
| 2007/0199745 A1 | 8/2007 | Hayashi |
| 2013/0116866 A1* | 5/2013 | Perkins ................. B60W 10/08 701/22 |
| 2013/0274981 A1 | 10/2013 | Kraemer |
| 2014/0288743 A1 | 9/2014 | Hokoi et al. |
| 2014/0364275 A1 | 12/2014 | Kagerer et al. |
| 2015/0105949 A1 | 4/2015 | Wright et al. |
| 2015/0314776 A1 | 11/2015 | Yu |
| 2015/0353068 A1 | 12/2015 | Nefcy et al. |
| 2016/0304086 A1* | 10/2016 | Mansour ................. B60K 6/48 |
| 2018/0265070 A1* | 9/2018 | Wiesbeck ......... B60W 50/0097 |

FOREIGN PATENT DOCUMENTS

| | | | |
|---|---|---|---|
| CN | 104554247 A | 4/2015 | |
| CN | 105035087 A | 11/2015 | |
| CN | 105128861 A | 12/2015 | |
| DE | 44 22 636 A1 | 1/1996 | |
| DE | 10 2008 000 629 A1 | 9/2009 | |
| DE | 10 2010 039 375 A1 | 2/2012 | |
| DE | 10 2011 005 803 A1 | 9/2012 | |
| DE | 10 2013 210 706 A1 | 12/2014 | |
| EP | 1 366 949 A1 | 12/2003 | |
| EP | 2 792 562 A1 | 10/2014 | |
| JP | 2006288051 A * | 10/2006 | ................ H02P 3/22 |

OTHER PUBLICATIONS

German-language Written Opinion (PCT/ISA/237) issued in PCT Application No. PCT/EP2017/050874 dated Apr. 20, 2017 (six (6) pages).

German-language Search Report issued in counterpart German Application No. 10 2016 200 605.3 dated Nov. 15, 2016 with Partial English translation (twelve (12) pages).

Chinese-language Office Action issued in Chinese Application No. 201780006175.5 dated Jul. 21, 2020 with English translation (11 pages).

Chinese-language Office Action issued in Chinese Application No. 201780006175.5 dated Jul. 9, 2021 with English translation (13 pages).

* cited by examiner

CONTROL SYSTEM COMPRISING AT LEAST ONE ELECTRONIC CONTROL UNIT FOR CONTROLLING AN INTERNAL COMBUSTION ENGINE IN A HYBRID VEHICLE

CROSS REFERENCE TO RELATED APPLICATIONS

This application is a continuation of PCT International Application No. PCT/EP2017/050874, filed Jan. 17, 2017, which claims priority under 35 U.S.C. § 119 from German Patent Application No. 10 2016 200 605.3, filed Jan. 19, 2016, the entire disclosures of which are herein expressly incorporated by reference.

BACKGROUND AND SUMMARY OF THE INVENTION

The invention relates to a control system comprising at least one electronic control unit for controlling an internal combustion engine in a hybrid vehicle.

For many years, hybrid vehicles which contain at least one internal combustion engine and at least one electric motor as drive motors have been in mass production. Such hybrid vehicles have control systems comprising at least one electronic control unit which, in particular by means of appropriately programmed functional modules, carry out various operating methods for selecting an operating mode matched to the respectively current driving situation. Selectable operating modes are, in particular, purely electric driving (only the electric motor drives; "e-mode", "e-drive"), purely internal combustion engine driving (only the internal combustion engine drives) and/or hybrid-driven driving (both the electric motor and the internal combustion engine drive).

Known operating methods primarily take into account the state of charge of the battery or of another electric energy store (e.g. Super-Cap) to select the operating mode.

It is an object of the invention to improve a control system of the type mentioned at the beginning with regard to the robustness of purely electric driving with respect to an unintended operating mode change and the comfort of internal combustion engine starting.

According to the invention, this and other objects are achieved by a control system in accordance with embodiments of the invention.

The control system according to the invention comprises at least one electronic control unit for controlling an internal combustion engine in a hybrid vehicle, which detects at least the vehicle speed and the desired driving performance of the driver, a safety control system or a driver assistance system. The control unit is configured (in particular programmed) in such a way that, below a predefined vehicle speed threshold and/or if an urban area is detected, starting from purely electric driving, it starts the internal combustion engine only when the current desired driving performance exceeds a predefined upper threshold, preferably after the (known) maximum possible tractive force on the wheel for purely electric driving has at least been reached.

By way of the invention, in particular when driving in an urban area, purely electric driving is maintained for as long as possible but adequate starting robustness in the event of a comparatively high desired driving performance is ensured.

In a development of the invention, the control unit is configured in such a way that the predefined upper threshold of the desired driving performance is defined below a vehicle speed-independent desired driving performance threshold provided for an escape function (in particular the kick-down position of the gas pedal). By means of this development of the invention, with good starting robustness, adequate starting comfort is simultaneously achieved.

Preferably, the control unit is also configured in such a way that, above the predefined vehicle speed threshold and/or outside the urban area, a dynamic desired driving performance prediction can be performed, by way of which the internal combustion engine can be started even before the predefined upper threshold of the desired driving performance is exceeded by the current desired driving performance and/or before the maximum possible tractive force on the wheel for purely electric driving is exceeded. For example, by using the current desired driving performance (in particular the current gas pedal angle) and by using the current gradient thereof, the dynamic desired driving performance prediction can calculate in advance whether the maximum possible tractive force on the wheel for purely electric driving will thereby soon be exceeded with a comparatively high probability. This development of the invention contributes to a further increase in the starting comfort at higher speeds, in particular outside the urban area.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
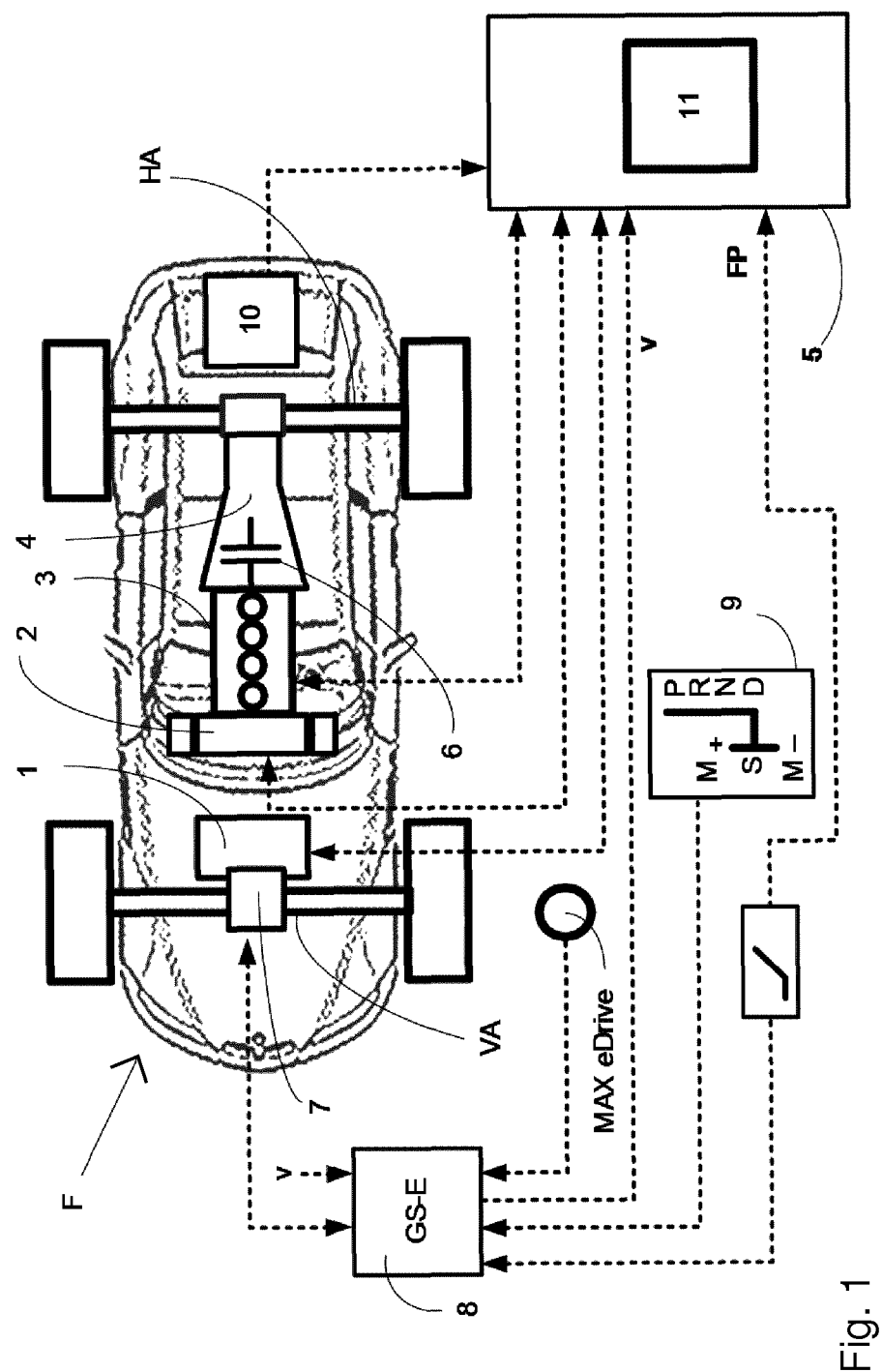
FIG. 1 shows essential components for the functional operation of the control system according to an embodiment of the invention in a hybrid vehicle.

FIG. 1 illustrates a so-called road-locked hybrid vehicle F (e.g. a BMW i8) with an electric motor 1, which acts, for example, on the front axle VA as a first drive motor, and with an internal combustion engine 3, which acts on the rear axle HA as a second drive motor. A second electric motor 2 can be provided in addition to the internal combustion engine 3. Furthermore, a second transmission 4, preferably in the form of an electronically controllable automatic transmission (such as is already known from the prior art from BMW mass produced vehicles), is connected to the internal combustion engine 3 on the input side. In an analogous way, the invention can also be applied to a differently arranged order of the components 2, 3 and 4. In addition, the electric motor 1 could be arranged on the rear axle and the internal combustion engine 3 on the front axle. The electric motor 1 co-operates with a two-gear transmission 7 without any interposed clutch.

The hybrid vehicle F can usually be operated in an operating mode (AUTO eDrive) with an internal combustion engine 3 that can be started and stopped automatically as necessary. Furthermore, the hybrid vehicle F can have a selection device ("MAX eDrive" pushbutton) that can be operated by the driver for the manual change to an operating mode (MAX eDrive), in which in principle driving is as far as possible purely electric.

Furthermore, in the hybrid vehicle there is an electronic transmission selection device 9 known per se (for example from BMW mass produced vehicles), via which driving positions P, R, N and D and switching modes "S" or "M," which are customary for the driver and provided for the automatic transmission 4, can be selected.

Finally, a likewise known gas pedal is illustrated schematically in FIG. 1, the deflection of which, in particular in the form of a gas pedal angle FP, is detected, as is known, for example via a potentiometer.

The drive control of the hybrid vehicle F is preferably carried out by a first electronic control device 5, by which in principle a wheel-torque-based overall drive control for all the drive motors that are present can be carried out. Furthermore, a functional module GS-E for transmission control is contained, for example, likewise in the control device 5 or preferably (as shown here) in an additional control device 8 mechatronically locally more closely associated with the two-gear transmission 7.

To identify the vehicle operation in the urban area, a navigation system 10 can also be connected to the control unit 5.

The control devices 5 and 8 are preferably connected to each other via a data bus (e.g. CAN) and exchange sensor and control signals as necessary. For example, the control device 5 can obtain the vehicle speed v as information from the control device 8.

The control device 5 has a functional module 11 according to the invention, for example in the form of a software program module. The functional module 11 is configured (in particular programmed) in such a way that it makes the control system according to the invention functionally operable.

Stored in the control device 5 or in the functional module 11 are characteristics and/or algorithms for changing the operating modes, for example from the known MAX eDrive modes to the AUTO eDrive mode or vice versa, which will be explained in detail below by using FIGS. 2 to 4.

Figure 2:
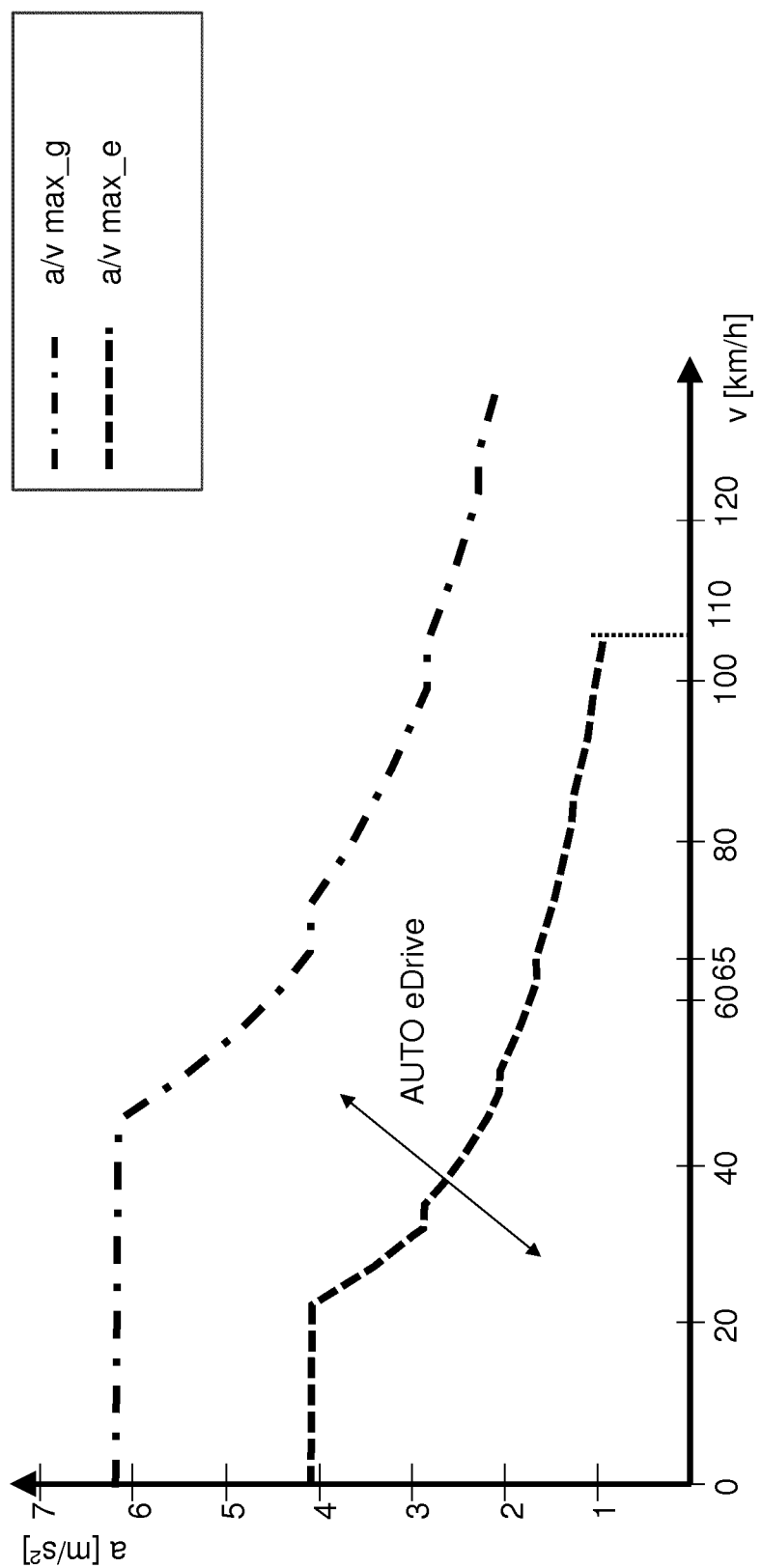
FIG. 2 shows a characteristic-based illustration of the functional operation for starting the internal combustion engine in an already known "AUTO eDrive mode", illustrated as a speed-dependent potential vehicle acceleration on a level roadway.

FIG. 2 illustrates, schematically, the basically known AUTO eDrive mode, in which, in particular depending on the purely electric maximum possible tractive force on the wheel (illustrated as a speed-dependent potential vehicle acceleration (limiting) characteristic on a level roadway $a/v\ max\_e$) and the maximum possible tractive force on the wheel for combined (electric and internal combustion engine) driving (illustrated as a speed-dependent potential vehicle acceleration (limiting) characteristic on a level roadway $a/v\ max\_g$), the internal combustion engine 3 is automatically started and stopped as necessary.

Figure 3:
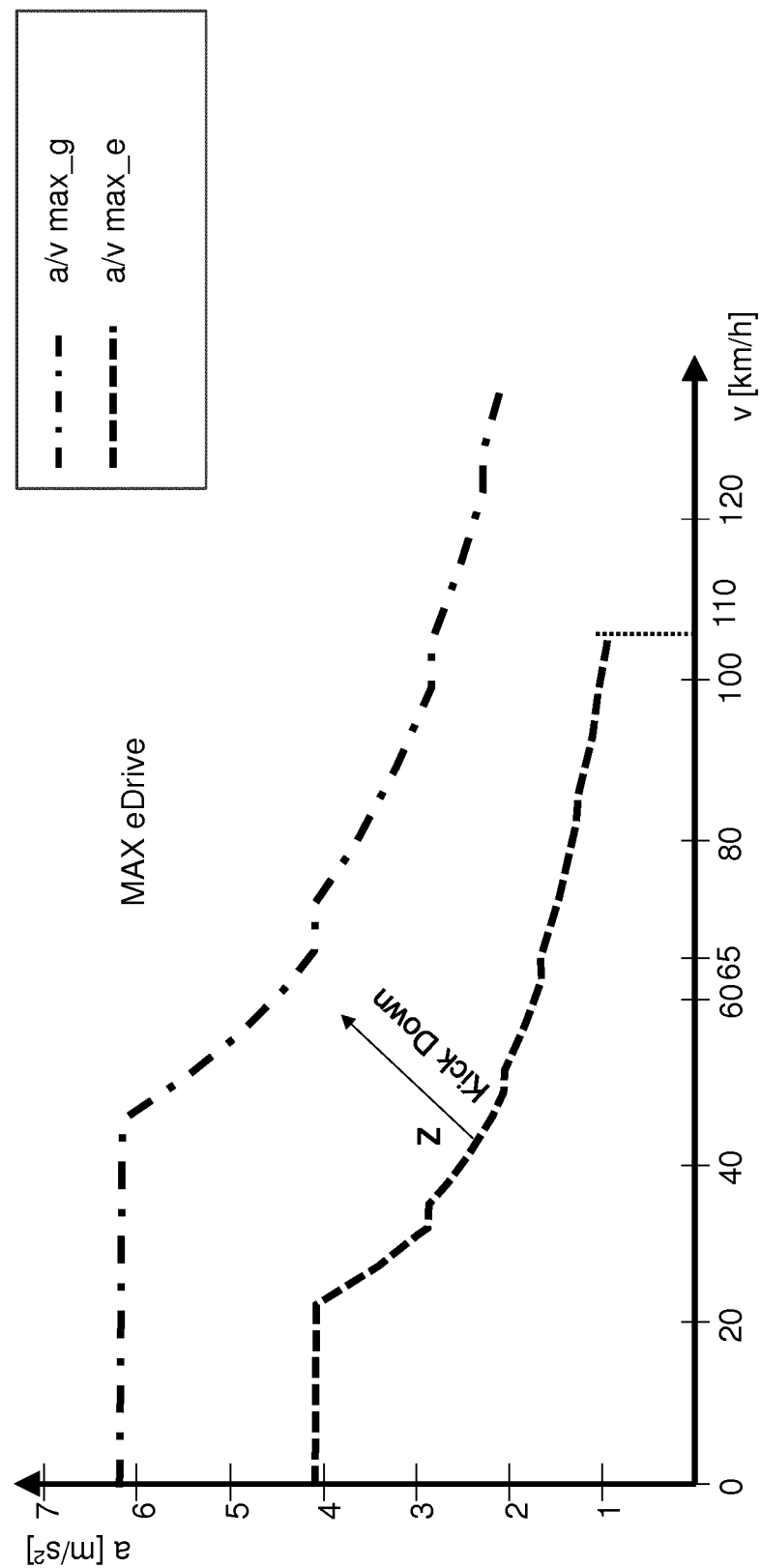
FIG. 3 shows a characteristic-based illustration of the functional operation for starting the internal combustion engine in an already known "MAX eDrive mode" with escape function, illustrated as a speed-dependent potential vehicle acceleration on a level roadway.

FIG. 3 illustrates, schematically, the known MAX eDrive mode, in which, in accordance with the maximum possible tractive force on the wheel ($a/v\ max\_e$) for purely electric driving, in principle driving is carried out purely electrically. However, within the meaning of an escape function, the internal combustion engine 3 is nevertheless started if a kick-down command is output, in particular via the gas pedal. The abbreviation Z identifies the starting of the internal combustion engine 3.

By using FIG. 4, the control system according to the invention and the functional operating mode thereof as distinct from the prior art will be explained in more detail. In FIG. 4, a vehicle speed threshold of about 65 km/h here is predefined. This threshold is chosen, by way of example, since it reflects the generally maximum speed v driven in urban regions (towns). The new operating mode according to the invention is therefore also called "URBAN eDrive" by the Applicant. According to the invention, below this vehicle speed threshold of about 65 km/h here and/or when an urban region is detected by the navigation system 10, starting from purely electric driving, the control unit 5 or the functional module 11 starts the internal combustion engine 3 only when the current desired driving performance FP exceeds a predefined upper threshold of about 90% here, preferably after the acceleration-speed (limiting) characteristic $a/v\ max\_e$ for purely electric driving has at least been reached.

The upper threshold of the desired driving performance FP of about 90% here is preferably defined below the vehicle speed-independent desired driving performance threshold—kick-down here—provided for the escape function according to FIG. 3.

Figure 4:
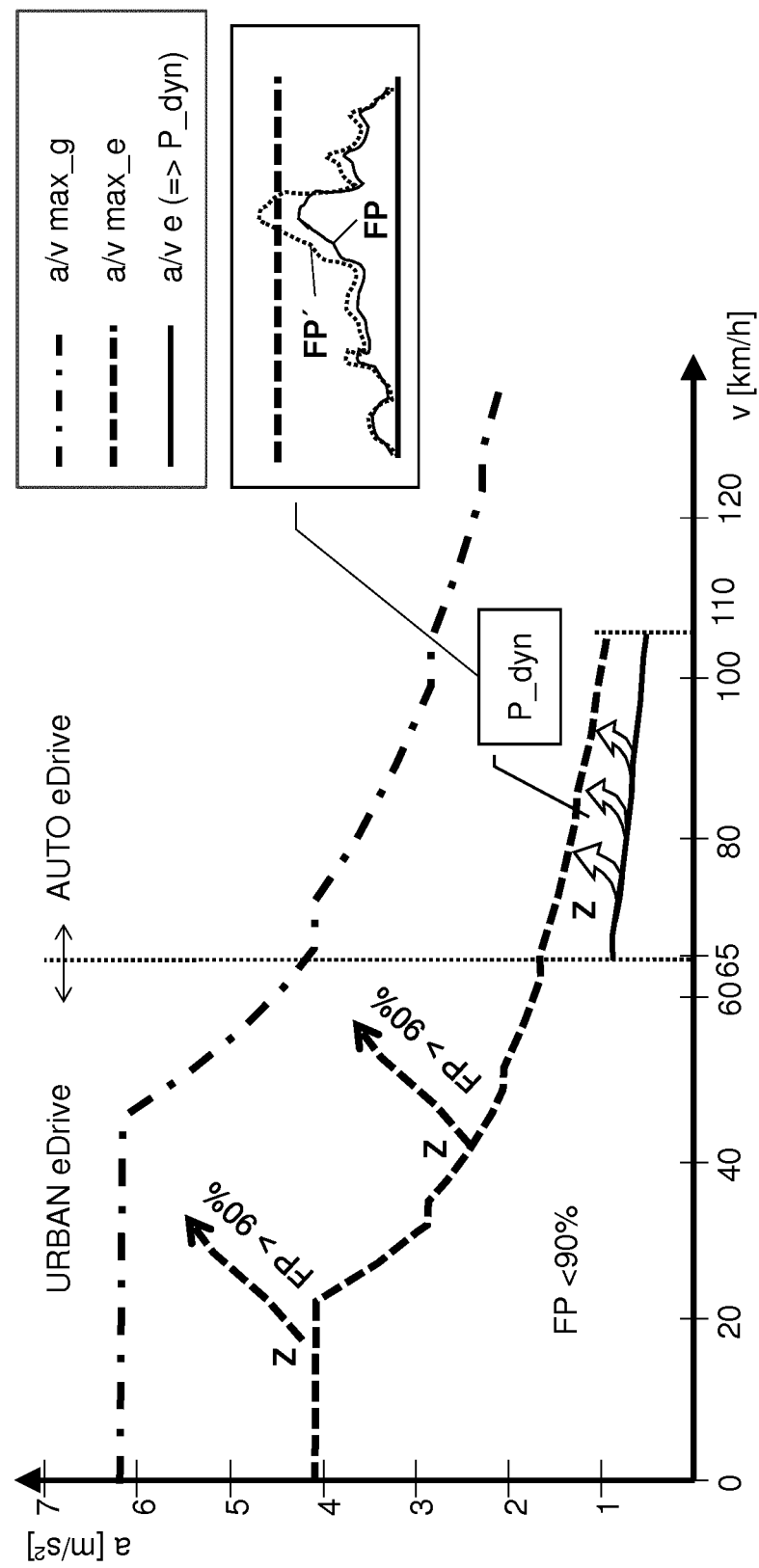
FIG. 4 shows a characteristic-based illustration of the functional operation for starting the internal combustion engine in the new "URBAN eDrive mode" by way of the control system according to the invention, illustrated as a speed-dependent potential vehicle acceleration on a level roadway.

According to FIG. 4, the control unit 5 is configured in such a way that, above the predefined vehicle speed threshold of about 65 km/h here, a dynamic desired driving performance prediction $P\_dyn$ is performed, by way of which, even before the predefined upper threshold of 90% here of the desired driving performance FP is exceeded and/or before the maximum possible tractive force on the wheel $a/v\ max\_e$ for purely electric driving is exceeded, the internal combustion engine 3 can be started. The dynamic desired driving performance prediction $P\_dyn$ calculates an anticipated desired driving performance $FP'$, for example by using the current desired driving performance FP and by using the current gradient thereof. A check is made by the control unit 5 as to whether the maximum possible tractive force on the wheel for purely electric driving $a/v\ max\_e$ will thereby soon be exceeded with a comparatively high probability. If this is the case, the internal combustion engine 3 is started before the purely electric maximum possible tractive force $a/v\ max\_e$ is reached.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system, comprising:
an electronic control unit configured to control an internal combustion engine in a hybrid vehicle, wherein
the control unit is configured to detect a vehicle speed and an accelerator pedal angle,
below a predefined vehicle speed threshold, the control unit starts the internal combustion engine only:
after determining whether or not a maximum possible tractive force on a wheel for purely electric driving has been reached, and
when the current accelerator pedal angle exceeds a given value.

2. The control system as claimed in claim 1, wherein the control unit is configured such that the predefined upper threshold of the accelerator pedal angle is defined below a vehicle speed-independent accelerator pedal angle threshold provided for an escape function.

3. The control system as claimed in claim 2, wherein the control unit is configured such that, above the predefined vehicle speed threshold, a dynamic accelerator pedal angle prediction is performable, by which, even before the predefined upper threshold of the accelerator pedal angle is exceeded by the current accelerator pedal angle or before the accelerator pedal angle of the maximum possible tractive force on the wheel for purely electric driving is exceeded, the internal combustion engine is startable.

4. An electronic control unit that controls an internal combustion engine in a hybrid vehicle, the electronic control unit comprising a processor and associated non-transitory memory having stored thereon program code that, when executed by the processor, carries out the acts of:
  detecting a vehicle speed and an accelerator pedal angle;
  in a purely electric driving mode, starting the internal combustion engine only
    when a current accelerator pedal angle exceeds a predefined upper threshold when below a predefined vehicle speed threshold, and
    after a maximum possible tractive force on a wheel for purely electric driving has been reached.

5. The control system as claimed in claim 1, wherein the control unit is configured such that the predefined upper threshold of the accelerator pedal angle is defined below a vehicle speed-independent accelerator pedal angle threshold provided for an escape function.

6. The control system as claimed in claim 1, wherein the control unit is configured such that, above the predefined vehicle speed threshold, a dynamic accelerator pedal angle prediction is performable, by which, even before the predefined upper threshold of the accelerator pedal angle is exceeded by the current accelerator pedal angle or before the accelerator pedal angle of the maximum possible tractive force on the wheel for purely electric driving is exceeded, the internal combustion engine is stumble.

\* \* \* \* \*